United States Patent
Hamamoto et al.

(10) Patent No.: US 6,436,582 B1
(45) Date of Patent: Aug. 20, 2002

(54) NON-AQUEOUS ELECTROLYTE AND LITHIUM SECONDARY BATTERY USING THE SAME

(75) Inventors: Toshikazu Hamamoto; Koji Abe; Tsutomu Takai; Yasuo Matsumori, all of Ube (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 09/556,640

(22) Filed: Apr. 24, 2000

(51) Int. Cl.$^7$ .......................... H01M 6/16; H01M 10/40
(52) U.S. Cl. ................... 429/340; 429/324; 252/62.2
(58) Field of Search ................... 429/340, 325, 429/324, 188, 326, 207, 344, 345; 252/62.2

(56) References Cited

U.S. PATENT DOCUMENTS 5,358,620 A * 10/1994 Golovin et al. ............. 204/421
6,245,465 B1 * 6/2001 Angell et al. ............... 429/340

FOREIGN PATENT DOCUMENTS

| JP | 9-27328 | * 1/1997 | ............ H01M/6/16 |
| JP | 9-147913 | * 6/1997 | ......... H01M/10/40 |
| JP | 11-214001 | | 8/1999 |

OTHER PUBLICATIONS

Derwent Patent Abstract of Japanese Application No. 11–214001 08/99.

* cited by examiner

*Primary Examiner*—Stephen Kalafut
*Assistant Examiner*—R. Alejandro
(74) *Attorney, Agent, or Firm*—Morgan, Lewis & Bockius, LLP

(57) ABSTRACT

A non-aqueous electrolyte comprising (i) a non-aqueous solvent and (ii) an electrolyte salt dissolved therein and (iii) a disulfonate ester derivative having the formula (I):

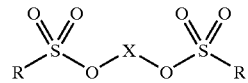

wherein R indicates a $C_1$ to $C_6$ alkyl group and X indicates a straight-chain alkylene group having a $C_2$–$C_6$ principal chain or a branched alkylene group having a $C_2$–$C_6$ principal chain with at least one side-chain composed of a. $C_1$–$C_4$ alkyl group, and also a lithium secondary battery using the same are disclosed.

10 Claims, No Drawings

NON-AQUEOUS ELECTROLYTE AND LITHIUM SECONDARY BATTERY USING THE SAME

BACKGROUND OF THE INVENTION

1. Field of the Invention

The present invention relates to a novel non-aqueous electrolyte having superior battery cycle characteristics and battery characteristics such as electrical capacity, storage characteristic, and also relates to a lithium secondary battery using the same.

2. Description of the Related Art

In recent years, lithium secondary batteries have been widely used as the power sources for driving compact electronic devices, etc. Lithium secondary batteries are mainly composed of a cathode, a non-aqueous electrolyte and an anode. In particular, a lithium secondary battery having a lithium complex oxide such as $LiCoO_2$ as a cathode and a carbonaceous material or lithium metal as an anode is suitably used. Further, as the electrolyte for a lithium secondary battery, a carbonate such as ethylene carbonate (EC) or propylene carbonate (PC) is suitably used.

However, a secondary battery having more superior battery cycle characteristic and battery characteristics such as electrical capacity has been desired.

A lithium secondary battery using a highly crystallized carbonaceous material such as natural graphite or artificial graphite as the anode sometimes suffer from breakdown of the electrolyte at the anode and an increase in the irreversible capacity or in some cases peeling of the carboneous material occur. The increase in the irreversible capacity or the peeling of the carbonaceous material occurs due to the decomposition of the solvent in the electrolyte during the charge thereof and is due to the electrochemical reduction of the solvent at the interface between the carbonaceous material and the electrolyte. In particular, PC having a low melting point and high dielectric constant has a high electroconductivity even at a low temperature. Nevertheless, when a graphite anode is used, there are problems that the PC cannot be used for the lithium secondary battery due to the decomposition thereof. Further, EC partially decomposes during the repeated charge and discharge thereof so that the battery performance is decreased. Therefore, the battery cycle characteristic and the battery characteristics such as electrical capacity are not necessarily satisfied.

SUMMARY OF THE INVENTION

The objects of the present invention are to solve the above-mentioned problems relating to an electrolyte for a lithium secondary battery and to provide a lithium secondary battery having a superior battery cycle characteristic and also superior battery characteristics such as the electrical capacity, charge storage characteristic under the charged condition and also to provide a lithium secondary battery using the same.

In accordance with the present invention, there is provided a non-aqueous electrolyte comprising (i) a non-aqueous solvent and (ii) an electrolyte salt dissolved therein and a disulfonate ester derivative having the formula (I):

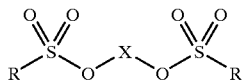

wherein R indicates a $C_1$ to $C_6$ alkyl group and X indicates a straight-chain alkylene group having a $C_2$–$C_6$ principal chain or a branched alkylene group having a $C_2$–$C_6$ principal chain with at least one side-chain composed of a $C_1$–$C_4$ alkyl group.

Further, in accordance with the present invention, there is provided a lithium secondary battery comprising (a) a cathode, b) an anode and (c) a non-aqueous electrolyte comprising (i) a non-aqueous solvent and (ii) an electrolyte salt dissolved therein and (iii) a disulfonate ester derivative having the formula (I);

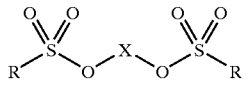

wherein R indicates a $C_1$ to $C_6$ alkyl group and X indicates a straight-chain alkylene group having a $C_2$–$C_6$ principal chain or a branched alkylene group having a $C_2$–$C_6$ principal chain with at least one side-chain composed of a $C_1$–$C_4$ alkyl group.

BEST MODE FOR CARRYING OUT THE PRESENT INVENTION

The disulfonate ester derivative having the formula (I) contained in the electrolyte has the role of being partially reduced and forming a passivation film at the surface of the anode carbonaceous material during the charging. Thus, it is believed that when an active, highly crystallized carbonaceous material such as natural graphite or artificial graphite is covered with a passivation film, the decomposition of the electrolyte is suppressed and the normal charging and discharging are repeated without impairing reversibility of the battery.

In the disulfonate ester derivative having the formula (I) contained in the electrolyte comprised of a non-aqueous solvent and an electrolyte salt dissolved therein, R is a $C_1$ to $C_6$ alkyl group, preferably those such as a methyl group, ethyl group, propyl group, butyl group, pentyl group, and hexyl group. The alkyl group may be a branched alkyl group such as an isopropyl group, isobutyl group, and isopentyl group.

Specific examples of a disulfonate ester derivative having the formula (I) are ethylene glycol dimethanesulfonate (i.e., R=methyl group, X=—$(CH_2)_2$— in the formula (I)), 1,3-propanediol dimethanesulfonate (i.e, R=methyl group, X=—$(CH_2)_3$—), 1,4-butanediol dimethanesulfonate (i.e., R=methyl group, X=—$(CH_2)_4$—), 1,6-hexanediol dimethanesulfonate (i.e., R=methyl group, X=—$(CH_2)_6$—), 1,4-butanediol diethanesulfonate (i.e., R=ethyl group, X=—$(CH_2)_4$—), 1,4-butanediol dipropanesulfonate (i.e., R=propyl group, X=—$(CH_2)_4$—), 1,4-butanediol diisopropanesulfonate (i.e., R=isopropyl group, X=—$(CH_2)_4$—), propylene glycol dimethane sulfonate (i.e., R=methyl group, X=—$CH(CH_3)$—$CH_2$—), 1,2-butane diol dimethane sulfonate (i.e., R=methyl group, X=—$CH(C_2H_5)$—$CH_2$—), 1,3-butane diol dimethane sulfonate (i.e., R=methyl group, X=—$CH(CH_3)$—$(CH_2)_2$—), 2-ethyl-1,3-hexane diol dimethane sulfonate (i.e., R=methyl group, X=—$CH_2$—$CH(C_2H_5)$—$CH(C_3H_7)$—), 3-methyl-1,5-pentane diol dimethane sulfonate (i.e., R=methyl group, X=—$(CH_2)_2$—

CH(CH$_3$)—(CH$_2$)$_2$—), 2-methyl-2,4-pentane diol dimethane sulfonate (i.e., R=methyl group, X=—CH(CH$_3$)$_2$—CH$_2$—CH(CH$_3$)—), 2,3-butane diol dimethane sulfonate (i.e., R=methyl group, X=—C(CH$_3$)—CH(CH$_3$)—)—, 3-methyl-1,2-butane diol methane sulfonate (i.e., R=methyl group, X=—CH(CH(CH$_3$)$_2$)—CH$_2$—).

It should be noted that the two R's in the formula (I) may be the same or may be different, but a disulfonate ester derivative having the same R's is preferably used from the viewpoint of the easy synthesis.

If the content of the disulfonate ester derivative having the formula (I) is excessively large, the conductivity, etc., of the electrolyte changes and the battery performance sometimes is decreased. Further, if the content is excessively small, a sufficient passivation film is not formed and the desired battery performance is not obtained. Thus, a range of 0.01 to 50% by weight, in particular 0.1 to 20% by weight, based upon the weight of the electrolyte is preferred.

The non-aqueous solvent used in the present invention is preferably comprised of a high dielectric solvent and a low viscosity solvent.

Examples of the high dielectric solvent are cyclic carbonates such as ethylene carbonate (EC), propylene carbonate (PC), and butylene carbonate (BC). These high dielectric solvents may be used alone or in any mixture thereof.

Examples of the low viscosity solvent are a linear carbonate such as dimethyl carbonate (DMC), methylethyl carbonate (MEC), and diethyl carbonate (DEC); an ether such as tetrahydrofuran, 2-methyl tetrahydrofuran, 1,4-dioxane, 1,2-dimethoxyethane, 1,2-diethoxyethane, and 1,2-dibutoxyethane; a lactone such as γ-butylolactone, a nitrile such as acetonitrile, an ester such as methyl propionate, and an amide such as dimethyl formamide. These low viscosity solvents may be used alone or in any mixture thereof.

The high dielectric solvent and low viscosity solvent may be freely selected and combined for use. It should be noted that the above high dielectric solvent and low viscosity solvent are used in a ratio of normally 1:9 to 4:1, preferably 1:4 to 7:3 by volume (i.e., high dielectric solvent:low viscosity solvent).

Examples of the electrolyte salt used in the present invention are LiPF$_6$, LiBF$_4$, LiClO$_4$, LiN(SO$_2$CF$_3$)$_2$, LiN(SO$_2$C$_2$F$_5$)$_2$, LiC(SO$_2$CF$_3$)$_3$, LiPF$_4$(CF$_3$)$_2$, LiPF$_3$(CF$_3$)$_3$, LiPF$_3$(C$_2$F$_5$)$_3$ etc. These salts may be used alone or may be used in any combination thereof. These salts are normally used in concentrations of 0.1 to 3M, preferably 0.5 to 1.5M.

The electrolyte of the present invention can be obtained by, for example, mixing the above-mentioned high dielectric solvent and low viscosity solvent, dissolving the electrolyte salt therein, and further dissolving the disulfonate ester derivative having the formula (I) therein.

The electrolyte of the present invention is used as a constituent of a lithium secondary battery. The constituents, other than the electrolyte, of the secondary battery are not particularly limited. Various constituents generally used in the prior art may be used.

For example, as the cathode material (i.e., cathode active material), a complex metal oxide of (i) at least one metal selected from the group consisting of cobalt, manganese, nickel, chrome, iron, and vanadium and (ii) lithium is used. Examples of such a complex metal oxide are LiCoO$_2$, LiMn$_2$O$_4$, LiNiO$_2$, etc.

The cathode can be prepared by mixing the cathode material with a conductive agent such as acetylene black or carbon black, a binder such as polytetrafluoroethylene (PTFE), and polyvinylidene fluoride (PVDF) to form a cathode paste, then coating this cathode paste on a collector such as aluminum foil or a stainless steel foil or lath, followed by drying, compression molding, and then heat treating at a temperature of at 50 to 250° C. for about 2 hours in vacuo.

As the anode active material, lithium metal, lithium alloy and carbonaceous materials having a graphite-type crystalline structure capable of intercalation and deintercalation lithium such as thermally decomposed carbons, cokes, graphites (e.g., natural graphite, artificial graphite), combustion organic polymer substances, carbon fibers as well as composite tin oxides are used. In particular, carbonaceous materials having a graphite-type structure and having a lattice spacing ($d_{002}$) of 0.335 to 0.340 nm is preferably used. The powdery materials such as the carbonaceous material are mixed with a binder such as ethylene propylene diene terpolymer (EPDM), polytetrafluoroethylene (PTFE), polyvinylidene fluoride (PVDF) for use as an anode paste.

The configuration of the lithium secondary battery is not particularly limited. A coin battery having a cathode, an anode, a single layer or multiple layer separator and further a cylindrical battery, prismatic battery, etc. having a cathode, anode, and roll-shaped separator may be mentioned as examples. It should be noted that, as the separator, a known polyolefin microporous film, woven fabric, nonwoven fabric, etc. can be used.

EXAMPLES

The present invention will now be further explained in detail, but is by no means limited to, the following Examples and Comparative Examples.

Example 1

Preparation of Electrolyte

A non-aqueous solvent of PC:DMC (volume ratio)=1:2 was prepared, LiPF$_6$ was dissolved therein to a concentration of 1M to prepare the electrolyte, then ethylene glycol dimethanesulfonate (i.-e., R=methyl group, X=—(CH$_2$)$_2$— in the formula (I)) was dissolved as a disulfonate ester derivative (i.e., the additive) to 1.0% by weight based upon the weight of the electrolyte.

Fabrication of Lithium Secondary Battery and Determination of Battery Characteristics 80% by weight of LiCoO$_2$ (i.e., the cathode active material), 10% by weight of acetylene black (i.e., the conductive agent), and 10% by weight of polyvinylidene fluoride (i.e., the binder) were mixed, followed by adding 1-methyl-2-pyrrolidone to form a slurry, which was then coated on an aluminum foil. Next, this was dried and compression molded to form the cathode. On the other hand, 90% by weight of natural graphite (i.e., the anode active material) and 10% by weight of polyvinylidene fluoride (i.e., the binder) were mixed, followed by adding 1-methyl-2-pyrrolidone to form a slurry, which was then coated on a copper foil. Next, this was dried, compression molded, and heat treated to form the anode. A separator of a polypropylene porous film was used and the above-prepared electrolyte was injected to prepare a coin battery having a diameter of 20 mm and a thickness of 3.2 mm.

This coin type battery was charged at room temperature (20° C.) by a 0.8 mA constant current and constant voltage for 5 hours to the end voltage of 4.2V, then was discharged under a constant current of 0.8 mA to the end voltage of 2.7V. This charging and discharging were repeated. The initial charging and discharging capacity was about the same as with the case of use of 1M LiPF$_6$+EC:DMC (volume ratio)=1:2, as an electrolyte, without using the additives (i.e., Comparative Example 2). The battery characteristics after 50 cycles were measured, whereupon the retaining rate of the discharging capacity, when the initial discharge capacity was 100%, was 80.4%. Further, the low temperature characteristics were also good. The manufacturing conditions of coin batteries and the battery characteristics of the same are shown in Table 1.

Example 2

The same procedure was followed as in Example 1 except for using, as the additive, 1,3-propanediol dimethanesulfonate (i.e., R=methyl group, X=—(CH$_2$)$_3$—) in an amount of 1.0% by weight based upon the weight of the electrolyte, to prepare the electrolyte and prepare a coin battery. The battery characteristics were measured after 50 cycles, whereupon the discharge capacity retaining rate was 82.3%. The manufacturing conditions of the coin battery and the battery characteristics are shown in Table 1.

Example 3

The same procedure was followed as in Example 1 except for using, as the additive, 1,4-butanediol dimethanesulfonate (i.e., R=methyl group, X=—(CH$_2$)$_4$—) in an amount of 1.0% by weight, based upon the weight of the electrolyte, to prepare the electrolyte and prepare a coin battery. The battery characteristics were measured after 50 cycles, whereupon the discharge capacity retaining rate was 84.6%. The manufacturing conditions of the coin battery and the battery characteristics are shown in Table 1.

Example 4

The same procedure was followed as in Example 1 except for using, as the additive, 1,6-hexanediol dimethanesulfonate (i.e., R=methyl group, X=—(CH$_2$)1—) in an amount of 1.0% by weight, based upon the weight of the electrolyte, to prepare the electrolyte and prepare a coin battery. The battery characteristics were measured after 50 cycles, whereupon the discharge capacity retaining rate was 83.9%. The manufacturing conditions of the coin battery and the battery characteristics are shown in Table 1.

Example 5

The same procedure was followed as in Example 1 except for using, as the additive, 1,4-butanediol diethanesulfonate (i.e., R=ethyl group, X=—(CH$_2$)$_4$—) in an amount of 1.0% by weight, based upon the weight of the electrolyte, to prepare the electrolyte and prepare a coin battery. The battery characteristics were measured after 50 cycles, whereupon the discharge capacity retaining rate was 82.2%. The manufacturing conditions of the coin battery and the battery characteristics are shown in Table 1.

Example 6

The same procedure was followed as in Example 1 except for using, as the additive, 1,4-butanediol dipropanesulfonate (i.e., R=n-propyl group, X=—(CH$_2$)$_4$—) in an amount of 1.0% by weight, based upon the weight of the electrolyte, to prepare the electrolyte and prepare a coin battery. The battery characteristics were measured after 50 cycles, whereupon the discharge capacity retaining rate was 84.0%. The manufacturing conditions of the coin battery and the battery characteristics are shown in Table 1.

Example 7

The same procedure was followed as in Example 1 except for using, as the additive, 1,4-butanediol diisopropanesulfonate (i.e., R=isopropyl group, X=—(CH$_2$)$_4$—) in an amount of 1.0% by weight, based upon the weight of the electrolyte, to prepare the electrolyte and prepare a coin battery. The battery characteristics were measured after 50 cycles, whereupon the discharge capacity retaining rate was 83.7%. The manufacturing conditions of the coin battery and the battery characteristics are shown in Table 1.

Example 8

The same procedure was followed as in Example 1 except for using, as the additive, 1,4-butanediol dimethanesulfonate (i.e., R=methyl group, X=—(CH$_2$)$_4$—) in an amount of 0.2% by weight, based upon the weight of the electrolyte to prepare the electrolyte and prepare a coin battery. The battery characteristics were measured after 50 cycles, whereupon the discharge capacity retaining rate was 80.8%. The manufacturing conditions of the coin battery and the battery characteristics are shown in Table 1.

Example 9

The same procedure was followed as in Example 1 except for using, as the additive, 1,4-butanediol dimethanesulfonate (i.e., R=methyl group, X=—(CH$_2$)$_4$—) in an amount of 10% by weight, based upon the weight of the electrolyte to prepare the electrolyte and prepare a coin battery. The battery characteristics were measured after 50 cycles, whereupon the discharge capacity retaining rate was 82.5%. The manufacturing conditions of the coin battery and the battery characteristics are shown in Table 1.

Comparative Example 1

A non-aqueous solvent of PC:DMC (volume ratio)=1:2 was prepared, and LiPF$_6$ was dissolved therein to a concentration of 1M. At this time, no disulfonate ester derivative (i.e., the additive) at all was added. This electrolyte was used to prepare a coin battery in the same way as in Example 1 and measure the battery characteristics, whereupon the PC was decomposed at the time of initial charging and no discharge at all was possible. The battery was disassembled after the initial charging and examined, whereupon peeling was observed at the graphite anode. The manufacturing conditions of the coin battery and the battery characteristics are shown in Table 1.

Example 10

A non-aqueous solvent of EC:DMC (volume ratio)=1:2 was prepared, and LiPF$_6$ was dissolved in this to a concentration of 1M to prepare the electrolyte, then 1,3-propanediol dimethanesulfonate (i.e., R=methyl group, X=—(CH$_2$)$_3$—) was added as a disulfonateester derivative (i.e., the additive) to 1.0% by weight, based upon the weight of the electrolyte. This electrolyte was used to prepare a coin battery in the same way as in Example 1 and measured the battery characteristics. The initial charging and discharging capacity was about the same as with the case of use of 1M LiPF$_6$+ EC:DMC (volume ratio)=1:2, as an electrolyte, without using the additives (i.e., Comparative Example 2). The battery characteristics after 50 cycles were measured, whereupon the discharge capacity retaining rate when using the initial discharge capacity as 100% was 91.1%. Further, the low temperature characteristics were good. The manufacturing conditions of the coin battery and the battery characteristics are shown in Table 1.

Example 11

The same procedure was followed as in Example 1 except for using, as the additive, 1,4-butanediol dimethanesulfonate (i.e., R=methyl group, X=—$(CH_2)_4$—) in an amount of 1.0% by weight, based upon the weight of the electrolyte, to prepare the electrolyte and prepare a coin battery. The battery characteristics were measured after 50 cycles, whereupon the discharge capacity retaining rate was 92.4%. The manufacturing conditions of the coin battery and the battery characteristics are shown in Table 1.

Example 12

The same procedure was followed as in Example 10 except for using, as the additive, 1,4-butanediol dipropanesulfonate (i.e., R=n-propyl group, X=—$(CH_2)_4$—) in an amount of 1.0% by weight, based upon the weight of the electrolyte, to prepare the electrolyte and prepare a coin battery. The battery characteristics were measured after 50 cycles, whereupon the discharge capacity retaining rate was 91.9%. The manufacturing conditions of the coin battery and the battery characteristics are shown in Table 1.

Example 13

The same procedure was followed as in Example 10 except for using artificial graphite instead of natural graphite as the anode active substance and using as the additive 1,4-butanediol dimethanesulfonate (i.e., R=methyl group, X=—$(CH_2)_4$—) in an amount of 1.0% by weight, based upon the weight of the electrolyte, to prepare the electrolyte and prepare a coin battery. The battery characteristics were measured after 50 cycles, whereupon the discharge capacity retaining rate was 90.3%. The manufacturing conditions of the coin battery and the battery characteristics are shown in Table 1.

Example 14

The same procedure was followed as in Example 10 except for using $LiMn_2O_4$, instead of $LiCoO_2$, as the cathode active substance and using as the additive 1,4-butanediol dimethanesulfonate (i.e., R=methyl group, X=—$(CH_2)_4$—) in an amount of 3.0% by weight, based upon the weight of the electrolyte to prepare the electrolyte and prepare a coin battery. The battery characteristics were measured after 50 cycles, whereupon the discharge capacity retaining rate was 90.7%. The manufacturing conditions of the coin battery and the battery characteristics are shown in Table 1.

Comparative Example 2

A non-aqueous solvent of EC:DMC (volume ratio)=1:2 was prepared, and $LiPF_6$ was dissolved therein to a concentration of 1M. At this time, no disulfonate ester derivative at all was added. This electrolyte was used to prepare a coin battery in the same way as in Example 1 and measure the battery characteristics. The discharge capacity retaining rate after 50 cycles was 83.8% with respect to the initial discharge capacity. The manufacturing conditions of the coin battery and the battery characteristics are shown in Table 1.

TABLE 1

| | Cathode | Anode | Additive | Am't added (wt. %) | Electrolyte composition (volume ratio) | 50 cycle discharge capacity retaining rate (%) |
|---|---|---|---|---|---|---|
| Ex. 1 | $LiCoO_2$ | Natural graphite | Ethylene glycol dimethane-sulfonate | 1 | 1M $LiPF_6$ PC/DMC = 1/2 | 80.4 |
| Ex. 2 | $LiCoO_2$ | Natural graphite | 1,3-propanediol dimethane-sulfonate | 1 | 1M $LiPF_6$ PC/DMC = 1/2 | 82.3 |
| Ex. 3 | $LiCoO_2$ | Natural graphite | 1,4-butanediol dimethane-sulfonate | 1 | 1M $LiPF_6$ PC/DMC = 1/2 | 84.6 |
| Ex. 4 | $LiCoO_2$ | Natural graphite | 1,6-hexanediol dimethane-sulfonate | 1 | 1M $LiPF_6$ PC/DMC = 1/2 | 83.9 |
| Ex. 5 | $LiCoO_2$ | Natural graphite | 1,4-butanediol diethane-sulfonate | 1 | 1M $LiPF_6$ PC/DMC = 1/2 | 82.2 |
| Ex. 6 | $LiCoO_2$ | Natural graphite | 1,4-butanediol dipropane-sulfonate | 1 | 1M $LiPF_6$ PC/DMC = 1/2 | 84 |
| Ex. 7 | $LiCoO_2$ | Natural graphite | 1,4-butanediol diisopropane-sulfonate | 1 | 1M $LiPF_6$ PC/DMC = 1/2 | 83.7 |
| Ex. 8 | $LiCoO_2$ | Natural graphite | 1,4-butanediol dimethane-sulfonate | 0.2 | 1M $LiPF_6$ PC/DMC = 1/2 | 80.8 |
| Ex. 9 | $LiCoO_2$ | Natural graphite | 1,4-butanediol dimethane-sulfonate | 10 | 1M $LiPF_6$ PC/DMC = 1/2 | 82.5 |
| Comp. Ex. 1 | $LiCoO_2$ | Natural graphite | None | | 1M $LiPF_6$ PC/DMC = 1/2 | Charging/ discharging not possible |
| Ex. 10 | $LiCoO_2$ | Natural graphite | 1,3-propanediol dimethane-sulfonate | 1 | 1M $LiPF_6$ EC/DMC = 1/2 | 91.1 |
| Ex. 11 | $LiCoO_2$ | Natural graphite | 1,4-butanediol dimethane-sulfonate | 1 | 1M $LiPF_6$ EC/DMC = 1/2 | 92.4 |
| Ex. 12 | $LiCoO_2$ | Natural graphite | 1,4-butanediol dipropane-sulfonate | 1 | 1M $LiPF_6$ EC/DMC = 1/2 | 91.9 |
| Ex. 13 | $LiCoO_2$ | Artificial graphite | 1,4-butanediol dimethane-sulfonate | 1 | 1M $LiPF_6$ EC/DMC = 1/2 | 90.3 |

TABLE 1-continued

| | Cathode | Anode | Additive | Am't added (wt. %) | Electrolyte composition (volume ratio) | 50 cycle discharge capacity retaining rate (%) |
|---|---|---|---|---|---|---|
| Ex. 14 | $LiMn_2O_4$ | Natural graphite | 1,4-butanediol dimethane-sulfonate | 3 | 1M $LiPF_6$ EC/DMC = 1/2 | 90.7 |
| Comp. Ex. 2 | $LiCoO_2$ | Natural graphite | None | | 1M $LiPF_6$ EC/DMC = 1/2 | 83.8 |

It should be noted that the present invention is not limited to the Examples described. various combinations easily deducible from the gist of the invention are also possible. In particular, the combinations of solvents in the Examples are not limitative. Further, the above Examples related to coin batteries, but the present invention may also be applied to cylindrical batteries and prismatic battery.

According to the present invention, as mentioned above, it is possible to provide a lithium secondary battery superior in the battery cycle characteristic and electrical capacity, storages characteristic, and other battery characteristics.

What is claimed is:

1. A non-aqueous electrolyte comprising (i) a non-aqueous solvent and (ii) an electrolyte salt dissolved therein and (iii) a disulfonate ester derivative having the formula (I):

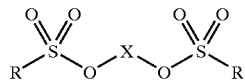

wherein R indicates a $C_1$ to $C_6$ alkyl group and X indicates a straight-chain alkylene group having a $C_2$–$C_6$ principal chain or a branched alkylene group having a $C_2$–$C_6$ principal chain with at least one side-chain composed of a $C_1$–$C_4$ alkyl group.

2. A non-aqueous electrolyte as claimed in claim 1, wherein R in the formula (I) is at least one group independently selected from the, group consisting of methyl, ethyl, propyl, butyl, pentyl and hexyl.

3. A non-aqueous electrolyte as claimed in claim 1, wherein the content of the disulfonate ester derivative (I) is 0.01 to 50% by weight, based upon the total amount of the electrolyte.

4. A non-aqueous electrolyte as claimed in claim 1, wherein the non-aqueous solvent is comprised of a mixture of at least one cyclic carbonate high dielectric solvent selected from the group consisting of ethylene carbonate (EC), propylene carbonate (PC) and butylene carbonate (BC) and at least one low viscosity solvent selected from the group consisting of dimethyl carbonate (DMC), methylethyl carbonate (MEC), diethyl carbonate (DEC), tetrahydrofuran, 2-methyl tetrahydrofuran, 1,4-dioxane, 1,2-dimethoxyethane, 1,2-diethyoxyethane, 1,2-dibutoxyethane γ-butylolactone, acetonitrile, methyl propionate, and dimethyl formamide in a volume ratio of 1:9 to 4:1.

5. A non-aqueous electrolyte as claimed in claim 1, wherein the electrolyte salt is at least one compound selected from the group consisting of $LiPF_6$, $LiBF_4$, $LiClO_4$, LiN $(SO_2CF_3)_2$, $LiN(SO_2C_2F_5)_2$, $LiC(SO_2CF_3)_3$, $LiPF_4(CF_3)_2$, $LiPF_3(CF_3)_3$, and $LiPF_3(C_2F_5)_3$.

6. A lithium secondary battery comprising (a) a cathode, (b) an anode and (c) a non-aqueous electrolyte comprising (i) a non-aqueous solvent and (ii) an electrolyte salt is dissolved therein and (iii) a disulfonate ester derivative having the formula (I):

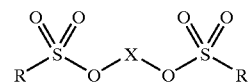

wherein R indicates a $C_1$ to $C_6$ alkyl group and X indicates a straight-chain alkylene group having a $C_2$–$C_6$ principal chain or a branched alkylene group having a $C_2$–$C_6$ principal chain with at least one side-chain composed of a $C_1$–$C_4$ alkyl group.

7. A lithium secondary battery as claimed in claim 6, wherein R in the formula (I) is a least one group independently selected from the group consisting of methyl, ethyl, propyl, butyl, pentyl and hexyl.

8. A lithium secondary battery as claimed in claim 6, wherein the content of the disulfonate ester derivative (I) is 0.01 to 50% by weight, based upon the total amount of the electrolyte.

9. A lithium secondary battery as claimed in claim 6, wherein the non-aqueous solvent is comprised of a mixture of at least one cyclic carbonate high dielectric solvent selected from the group consisting of ethylene carbonate (EC), propylene carbonate (PC) and butylene carbonate (BC) and at least one low viscosity solvent selected from the group consisting of dimethyl carbonate (DMC), methylethyl carbonate (MEC), diethyl carbonate (DEC), tetrahydrofuran, 2-methyl tetrahydrofuran, 1,4-dioxane, 1,2-dimethoxyethane, 1,2-diethyoxyethane, 1,2-dibutoxyethane γ-butylolactone, acetonitrile, methyl propionate, and dimethyl formamide in a volume ratio of 1:9 to 4:1.

10. A lithium secondary battery as claimed in claim 6, wherein the electrolyte salt is at least one compound selected from the group consisting of $LiPF_6$, $LiBF_4$, $LiClO_4$, LiN $(SO_2CF_3)_2$, LiN $(SO_2C_2F_5)_2$, $LiC(SO_2CF_3)_3$, $LiPF_4(CF_3)_2$, $LiPF_3(CF_3)_3$, and $LiPF_3(C_2F_5)_3$.

* * * * *